United States Patent [19]

Vinch

[11] 3,719,925
[45] March 6, 1973

[54] ELECTRONIC CONTROL FOR MACHINE TOOLS AND THE LIKE

[75] Inventor: Angelo N. Vinch, Warren, Mich.
[73] Assignee: Westinghouse Electric Corporation, Pittsburgh, Pa.
[22] Filed: Feb. 11, 1971
[21] Appl. No.: 114,504

[52] U.S. Cl. ............................ 340/147 P, 340/248 R
[51] Int. Cl. ................................................ H04q 9/00
[58] Field of Search. 340/147 P, 147 MT, 166 R, 248 R

[56] References Cited

UNITED STATES PATENTS

| | | | |
|---|---|---|---|
| 3,593,289 | 7/1971 | Lerch | 340/147 P |
| 3,541,512 | 11/1970 | Hilburger | 340/147 P |
| 3,432,841 | 3/1969 | Harvey et al | 340/248 R |
| 3,324,364 | 6/1967 | Caruthers | 340/147 P |

Primary Examiner—Donald J. Yusko
Attorney—A. T. Stratton and Clement L. McHale

[57] ABSTRACT

An electronic control having a plurality of electronic circuit cards for controlling the operation of various elements of a machine in accordance with commands received from transducers such as limit switches on the machine. One or more interface circuit cards receive AC signals from the transducers on the machine and convert these signals to DC output signals which are in turn supplied to a control card. The control card comprises a DC logic circuit which is responsive to the DC signals supplied by the interface cards to provide a DC control signal. The control card further includes a DC-AC converter which is responsive exclusively to the DC control signal for supplying an AC control signal to an electromechanical control device for controlling the particular operation of a particular machine element with which that control card is associated. Because this electromechanical control device is responsive only to this particular AC control signal, the entire logic circuitry for controlling that particular operation of that particular machine element is contained on a single circuit card. The circuit cards are also provided with indicating lamps which display the electrical status of the control to facilitate trouble shooting whenever there is a malfunction.

5 Claims, 4 Drawing Figures

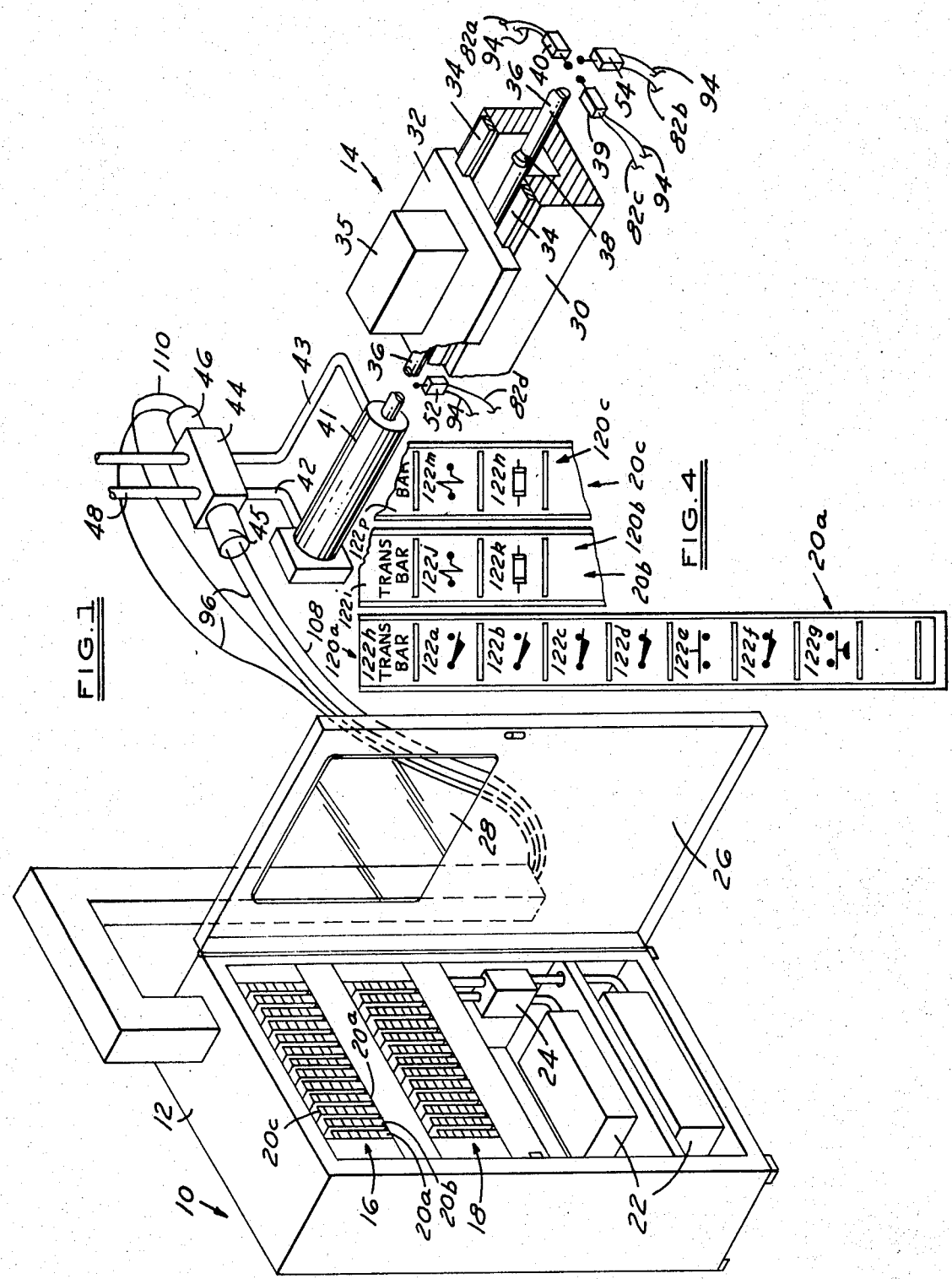

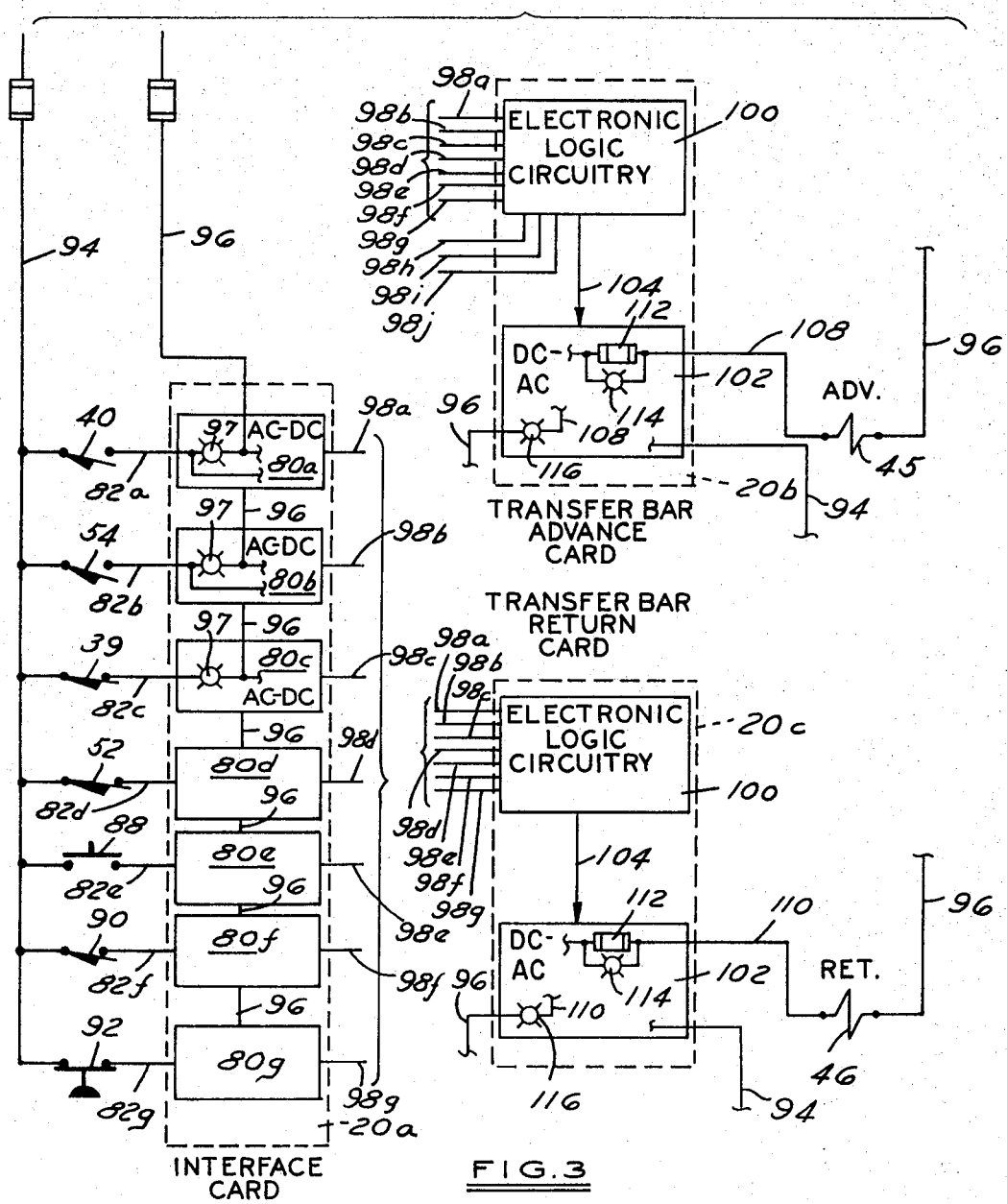
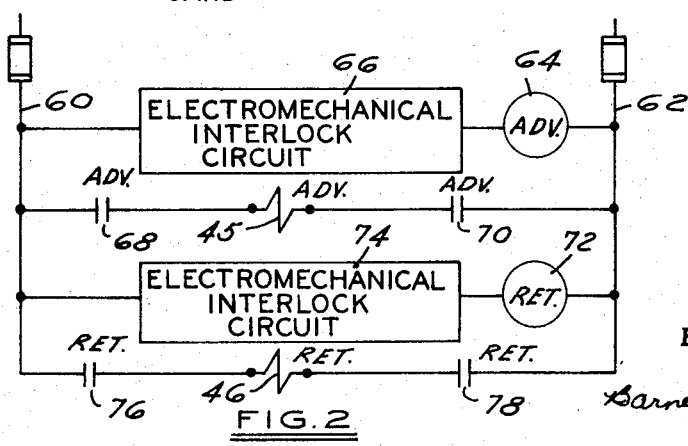

ELECTRONIC CONTROL FOR MACHINE TOOLS AND THE LIKE

This invention relates to machine control circuitry and more specifically to controls of the solid state type for machine tools, transfer machines and the like.

Recently, various types of solid state electronic controls have been replacing the older electromechanical type of controls. The latter type of control, while capable of performing the necessary control functions, has several undesirable features because of the electromechanical nature of the devices, such as relays and the like, employed therein. Notably, their lives are limited and their reliability is lower than that obtainable with solid state type devices. Moreover, electromechanical devices are somewhat bulky and when a large number are used in a particular control application, the trouble shooting task is particularly difficult.

In replacing the electromechanical type of control circuitry, various types of solid state logic circuits have been designed to perform the logic functions associated with the operation of the machine. These circuits typically include and-gates, or-gates, inverters and the like. Usually one or a number of similar circuits are constructed in a modular unit. A typical control for a machine comprises a plurality of various types of these modular units electrically connected in accordance with the control design. To facilitate the repair of faulty circuits, each unit is preferably provided with a plurality of terminals which are mechanically engageable with terminals in the electrical control panel. This arrangement permits a faulty unit to be bodily removed and replaced without any rewiring of individual components. Although the use of solid state controls greatly improves the reliability of the control circuitry, it does not necessarily follow that the trouble shooting task is greatly facilitated. If a failure occurs in a circuit which controls the operation of a particular machine element, it is often necessary to check the circuits on many of the circuit modules to pinpoint the defective module.

Another problem in converting a machine control circuit from the older electromechanical type to the newer solid state type involves the integration of the DC circuits of the solid state devices with the conventional AC circuits of devices such as solenoid valves and the like. With the older control, no problem existed because the entire circuitry was of the AC type. Now, when solid state controls operating at DC voltage levels are used to control AC apparatus on the machine, the possibility of intermixing the two voltages becomes apparent. Problems can arise if AC and DC wiring are both used on the machine, there being an increased likelihood that during repair or maintenance an AC line will be inadvertently connected to a DC control circuit.

Accordingly, it is an important object of this invention to provide an improved electronic control for a machine in which trouble shooting is greatly facilitated.

Likewise, another important object of the invention is to provide a solid state control for a machine in which all the DC circuitry is contained within the control cabinet.

It is also an object of the invention to provide an improved construction for an electronic machine control circuit.

Another object of the invention is to provide an electronic control for a machine control circuit in which all the solid state logic circuitry for controlling a particular element of the machine is grouped in a single electronic module.

Another object of the invention is to provide an improved electronic module for a machine control circuit in which the entire control circuitry for a particular machine element, both DC logic circuitry and AC power circuitry for that element is grouped within that module.

One more object of the invention is to provide an improved electronic control for a machine which is of modular type construction and which can perform a wide range of various types of functions with a minimum number of unique modules.

Other objects and features of the invention will become apparent in the following description and drawings in which:

FIG. 1 is a perspective view of the improved electronic control of the present invention and a schematic representation of a portion of a transfer machine which it is controlling.

FIG. 2 is an electrical schematic diagram of a portion of a prior art electromechanical type machine control circuit.

FIG. 3 is a circuit diagram substantially in block form of the improved electronic control circuit construction of the present invention.

FIG. 4 is an enlarged fragmentary view of the front of the control of FIG. 1.

Referring now to FIG. 1, the improved machine control 10 of the present invention is housed within a cabinet 12 and electrically connected to various components on a portion of a transfer machine 14. The upper portion of cabinet 12 includes two horizontal rows 16 and 18 of various electronic circuit cards, or modules, 20. The lower portion of cabinet 12 may include several power supplies 22 for circuit cards 20 and a junction box 24 for electrically connecting wiring from machine 14 with circuit cards 20. A front door 26, when closed, covers the front of cabinet 12 and includes a window 28 through which cards 20 may be viewed.

The portion shown of machine 14 comprises a base 30 which supports a plurality of pallets 32 (only one of which is shown) for horizontal axial movement on two parallel tracks 34. Pallets 32 are successively indexed to advance workpieces 35 between stations in the machine by means of an axially extending transfer bar 36 which includes a plurality of aligned dogs 38 at equally spaced intervals along its length. Transfer bar 36 is rotated about its axis by apparatus (not shown) to bring dogs 38 into and out of engagement with the rear edges of pallets 32. When dogs 38 are disengaged from pallets 32, a disengaged limit switch 39 is tripped; when dogs 38 are engaged with pallets 32, an engaged limit switch 40 is tripped. Transfer bar 36 is shifted lengthwise by means of a power cylinder 41 which is hydraulically connected by lines 42 and 43 to a solenoid actuated valve 44. The spool of valve 44 may be shifted by either an advance solenoid 45 or a return solenoid 46. Actuation of solenoid 45 connects line 42 to a source of pressure fluid 48 to shift transfer bar 36 forwardly to an advanced position. Actuation of solenoid 46 connects line 48 to line 43 to shift transfer bar 36 to a returned position. When transfer bar 36 is in the returned position, a returned limit switch 52 is tripped; and when in the advanced position, an advanced limit switch 54 is tripped.

At the beginning of a cycle, transfer bar 36 is at the returned position and dogs 38 are at the disengaged position. To index pallets 32 forwardly, transfer bar 36 is first rotated to bring dogs 38 into engagement with the rear edges of pallets 32. Transfer bar 36 is then advanced to shift pallets 32 to the next work station. When the forward movement of transfer bar 36 is arrested, dogs 38 are rotated out of engagement with pallets 32 and transfer bar 36 is then shifted to the returned position to await the next cycle.

FIG. 2 shows an electromechanical type control circuit which has been used in the past to control the operation of a machine element such as transfer bar 36. Electrical power, usually AC, to the control circuitry is provided by lines 60 and 62. An advance relay 64 is connected in series with an interlock circuit 66 between lines 60 and 62. Actuation of relay 64 closes contacts 68 and 70 to energize advance solenoid 45. A similar arrangement is provided for a return relay 72, which is connected in series with an interlock circuit 74 between lines 60 and 62 and which, when energized, closes contacts 76 and 78 to energize return solenoid 46. The interlock circuits 66 and 74 typically include series and parallel combinations of various normally open and normally closed contacts and switches. The design of each interlocking circuit 66 and 74, while including switches 39, 40, 52 and 54, might also be determined by the operational relationship of transfer bar 36 to other elements (not shown) of the machine. Essentially, prior solid state type control circuits have replaced the electromechanical interlocking circuits 66 and 74 by their solid state equivalents. However, as was pointed out, this has usually been done without regard to convenient trouble shooting considerations.

More specifically, the improved electronic control of the present invention greatly reduces the time and trouble involved in locating and repairing a defective control circuit with the arrangement shown in FIG. 3. While this control is described in relation to only the operation of transfer bar 36, it should be appreciated that this is typical of the other circuit cards 20 which are grouped within cabinet 12 to control the numerous other operating elements of machine 14. The electronic control circuit for transfer bar 36 is located on only three cards 20 within cabinet 12 which are: an interface card 20a, and two control cards, namely, a transfer bar advance card 20b and a transfer bar return card 20c.

Interface card 20a comprises a plurality of solid state AC-DC converters 80. The input 82 of each converter 80 is connected to a particular switch, or transducer, on the machine tool. More specifically, input 82a is connected to engaged limit switch 40; input 82b to advanced limit switch 54; input 82c to disengaged limit switch 39; input 82d to returned limit switch 52; and inputs 82e, 82f and 82g to three other switches 88, 90 and 92 respectively on the machine which provide interlocks for the control circuitry. The other terminal of each of these seven switches is supplied by one line 94 of a pair of AC lines 94 and 96, and each input circuit 82 is completed through the circuitry of its converter 80 to the other line 96. Each AC-DC converter 80 is an electronic circuit which converts an AC input voltage to a DC output voltage. The DC output of each converter 80 is taken at line 98 which is electrically connected within cabinet 12 to advance card 20b and return card 20c. In addition, each converter 80 includes an indicator lamp 97 which is electrically connected between lines 82 and 96 to light whenever an AC signal is being supplied from the switch to which it is connected.

Cards 20b and 20c are identical and comprise electronic logic circuitry 100 whose single output is electrically connected to a DC-AC converter 102 by line 104. The electronic logic circuitry 100 comprises a plurality of various electronic logic circuits including and-gates, or-gates and inverters. These elements are arranged to respond to D.C. output signals at selected output terminals such as 98a through 98j of the interface card 20a to which the logic current 100 is connected for providing a D.C. control signal at 104. Each circuit 100 comprises a plurality of input terminals, selected ones of which are connected to lines 98a through 98g in accordance with the design of the control to provide the proper operating sequence for transfer bar 36. Each converter 102 comprises an electronic switch, such as a triac, which is responsive to the signal at line 104. This switch electrically connects and disconnects line 94 to lines 108 and 110 at the output of each card 20b and 20c respectively. These outputs 108 and 110 are connected respectively to advance solenoid 45 and return solenoid 46 whose other terminals are connected to line 96. Each converter 102 further includes a fuse 112 in series with lines 108 and 110 and two indicator lamps 114 and 116. Lamp 114 is connected in parallel across fuse 112, and lamp 116 is connected between the output lines 108 and 110 and line 96. It should be noted that the only electrical connections between machine 14 and control cabinet 12 are the lines 82, 94, 96, 108, and 110 which are solely AC lines. Thus, the DC circuitry is contained entirely within cabinet 12, and the possibility of intermixing AC and DC lines on the machine is eliminated.

FIG. 4 is a front view of the cards 20a, 20b and 20c. A translucent strip 120 is mounted lengthwise on the front edge of each card and may be viewed through window 28 in cabinet door 26. Each strip is divided into a plurality of windows 122. The indicator lamps 97 on card 20a are positioned directly behind the strip 120a on that card. The lamps 114 and 116 on cards 20b and 20c are positioned behind strips 120b and 120c respectively. The various indicia in each window 122 are related to the various electrical components on the machine. For example, the indicia on strip 120a in windows 122a, 122b, 122c, 122d, 122e, 122f and 122g designate respectively switches 40, 54, 39, 52, 88, 90 and 92 in FIG. 1. The indicia on strip 120b in windows 122j and 122k indicate the advance solenoid 45 and the fuse 112 on that card while the indicia on card 20c in windows 122m and 122n indicate the return solenoid 46 and the fuse 112 on that card. The abbreviation "-trans. bar" at the top of each strip 120 in windows 122h, 122i and 122p designates the element of the machine, in this case the transfer bar, which is controlled by the circuitry on that card.

The operation of the control is now described for one operating cycle of transfer bar 36. At the beginning of the cycle transfer bar 36 is at the returned position causing the returned limit switch 52 to be tripped, and dogs 38 are at the disengaged position causing the disengaged limit switch 39 to be tripped. A cycle may be initiated by operating push button 88. Closure of switch 88 supplies an AC signal to converter 80e which in turn supplies a DC signal along line 98e to cards 20 (not shown in FIG. 3) which operates an actuator (not shown) to rotate dogs 38 from the disengaged position to the engaged position. Correspondingly, the light in window 122c is extinguished and window 122a is lighted. Actuation of the engaged limit switch 40 supplies an AC voltage to converter 80a which in turn supplies a DC signal at line 98a. The electronic logic circuitry 100 on card 20b is responsive to this signal and a DC signal is supplied at line 104 to cause converter 102 to supply AC voltage to the advance solenoid 45. The application of this AC voltage also lights window 122j on card 20b. The actuation of valve 45 now shifts the transfer bar 36 and pallets 32 forwardly to the advanced position. When transfer bar 36 comes to the advanced position the advanced limit switch 54 is tripped thereby lighting window 122b. The actuation of switch 54 is sensed by converter 80b to supply a signal to card 20b to de-energize solenoid 45 and thereby arrest the movement of transfer bar 36, the light in window 122j being extinguished. The signal from switch 54 is also supplied to other cards 20 (not shown in FIG. 3) to now rotate dogs 38 out of engagement with pallets 32. As dogs 38 move from the engaged position, the light in window 122a is extinguished and when the dogs 38 are fully disengaged, the disengaged limit switch 39 is tripped. Actuation of switch 39 lights window 122c and supplies a signal along line 98c to card 20c. The electronic logic circuitry 100 on this card is responsive to this signal and supplies a DC signal at line 104 to actuate converter 102. Current is now supplied to the return solenoid 46 and window 122m on card 20c is lighted. When the transfer bar is fully returned the returned limit switch 52 is tripped. The actuation of this switch is sensed by electronic logic circuitry 100 on card 20c to de-energize solenoid 46 and thereby arrest the movement of transfer bar 36. The window 122d lights and the light in window 122m is extinguished. This completes one operating cycle of transfer bar 36.

The particular advantage of the disclosed control system resides in the ease and rapidity with which a defective control circuit may be recognized and replaced. Because the entire control logic for a particular machine motion is situated on one circuit card, failure in that control circuit is corrected by simply removing that single card alone and replacing it with an identical new card. In determining whether the control logic is faulty it should, of course, be appreciated that the status of the input signals being supplied to that logic must be examined. So long as the input signals to the control logic are supplied in proper relation to the machine operation, there can be no question but that improper operation of the particular machine element being controlled by a particular logic card is occasioned by a faulty circuit thereon. In the situation where improper signals are being supplied to the logic circuit card, the particular cause of trouble will be apparent by examining the windows 122 on interface cards 20a. If a certain window is not lighted when it should be, the trouble will either be in that circuit card or in the switch supplying it. Replacement of that card by a new card will indicate which of the two is the true source of trouble. If the circuit operates properly with the new interface card then the former interface card was defective. However, if the operation remains faulty, the particular problem is in the switch supplying the card.

While the disclosed control system has been described for a single element of a machine, it should be apparent that more complex circuits may be constructed which incorporate the basic concept embodied herein. For example, a sufficient number of additional input terminals are available on control cards 20b and 20c for connection to the output terminals of additional interface cards 20a, such as shown by lines 98h, 98i and 98j on card 20b. In this way the logic circuitry may be interlocked with a large number of components on the machine, yet the entire logic circuitry for controlling the specific operation of that element is maintained on a single card to permit convenient replacement thereof in the event of failure. It should here be noted that it is not necessary that all the available input terminals on a control card such as 20b actually be connected to the outputs of an interface card 20a, the number of terminals being used being dependent upon the number of interlocks required. It should also be appreciated that the control logic circuit 100 may be constructed from electronic logic circuits in various fashions as is known to one skilled in the art. By increasing the number of available logic circuits therein, the overall number of unique circuit cards 20 for the electronic control may be minimized.

I claim:

1. In an electronic control of the circuit card type for controlling the operation of an element of a machine in predetermined relationship to the operation of other elements of the machine, the combination comprising at least one interface circuit card comprising a plurality of input terminals adapted to be electrically connected to selected transducers which supply AC signals in response to the operation of selected machine elements, a plurality of output terminals and means for converting an AC signal at each of its input terminals to a DC output signal at a corresponding output terminal, a control circuit card comprising a solid state DC logic circuit and a plurality of input terminals electrically connected with said logic circuit and means for electrically connecting selected input terminals on said control card with selected output terminals on said interface card, said logic circuit comprising a plurality of electronic logic elements arranged to respond to the DC output signals at said selected output terminals of said interface card to which said logic circuit is electrically connected for providing a DC control signal, said control circuit card further comprising means responsive to said DC control signal for supplying an AC control signal to control the operation of said machine element, said AC control signal being the sole AC control signal supplied by said electronic control for controlling the operation of said machine element, said means for supplying said AC control signal being exclusively responsive to said DC control signal, said DC control signal being derived exclusively from the response of the DC logic circuitry on said control card to the DC output signals at said selected output terminals of said interface card, whereby the entire logic circuit for controlling the operation of said machine element is provided on a single circuit card.

2. In combination an electronic control of the circuit card type, a machine, and means for electrically connecting said control to said machine, said machine comprising a plurality of operative machine elements, electromechanical control means for controlling the operation of one of said machine elements in response to an AC electrical control signal from said electronic control and a plurality of transducers for supplying AC signals to said electronic control in response to the operation of selected machine elements, said electronic control comprising at least one interface circuit card, a control circuit card and means for electrically connecting said two cards, said interface circuit card comprising a plurality of input terminals electrically connected to selected transducers, a plurality of output terminals and means for converting an AC signal at each of its input terminals to a DC output signal at a corresponding output terminal, said control circuit card comprising a solid state DC logic circuit and a plurality of input terminals electrically connected with said logic circuit, selected input terminals on said control card being electrically connected with selected output terminals on said interface card, said logic circuit comprising a plurality of electronic logic elements arranged to respond to the DC output signals at said selected output terminals of said interface card to which said logic circuit is electrically connected for providing a DC control signal, said control circuit card further comprising means responsive to said DC control signal for providing said AC control signal, said AC control signal being the sole AC control signal supplied by said electronic control to which said electromechanical control means is responsive, said means for providing said AC control signal being exclusively responsive to said DC control signal, said DC control signal being derived exclusively from the response of the DC logic circuitry on said control card to the DC output signals at said selected output terminals of said interface cards, whereby the entire logic circuit for controlling the operation of said one of said machine elements is provided on a single circuit card.

3. The combination called for in claim 2 including indicating means on at least one of said cards having indicia on selected portions thereof and lighting means electrically connected with the circuitry on said one of said cards for selectively lighting said selected portions in response to the electrical status of the circuitry on said one of said cards to which said lighting means is electrically connected.

4. The combination called for in claim 2 including indicating means on said at least one interface circuit card having indicia on a selected portion thereof comprising a representation of one of said selected transducers and lighting means electrically connected with said one transducer for lighting said indicia in response to actuation of said one transducer whereby a visual indication of the actuation of said one transducer is provided.

5. The combination called for in claim 2 including indicating means on said control circuit card having indicia on a selected portion thereof comprising a representation of said electromechanical control means and lighting means electrically connected to said means for providing said AC control signal for lighting said selected portion whenever said last-mentioned means is supplying said AC control signal whereby a visual indication of the operating status of said control card is provided.

* * * * *